United States Patent
McKinstrie (10) Patent No.: US 8,897,649 B2
(45) Date of Patent: Nov. 25, 2014

(54) OPTICAL TRANSPORT SYSTEM FOR TWO-CARRIER SIGNALS

(75) Inventor: Colin J. McKinstrie, Manalapn, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 513 days.

(21) Appl. No.: 13/238,737

(22) Filed: Sep. 21, 2011

(65) Prior Publication Data

US 2013/0071113 A1    Mar. 21, 2013

(51) Int. Cl.
*H04B 10/00* (2013.01)
*H04B 10/25* (2013.01)
*H04B 10/291* (2013.01)

(52) U.S. Cl.
CPC .............. *H04B 10/25* (2013.01); *H04B 10/291* (2013.01)
USPC ........... 398/140; 398/157; 398/162; 398/182; 398/183

(58) Field of Classification Search
CPC ...... H04B 10/25; H04B 10/505; H04B 10/54; H04B 10/548; H04B 10/2537; H04B 10/58; H04B 10/2543; H04B 10/588; G02F 1/35; G02F 1/3515; H01S 5/041
USPC ......... 398/182, 183, 186–188, 206, 208, 209, 398/202, 25
See application file for complete search history.

(56) References Cited

U.S. PATENT DOCUMENTS

| | | | |
|---|---|---|---|
| 7,062,176 B2 * | 6/2006 | Liu et al. | 398/159 |
| 7,164,526 B2 * | 1/2007 | McKinstrie et al. | 359/330 |
| 7,304,788 B2 * | 12/2007 | McKinstrie | 359/332 |
| 7,483,203 B2 | 1/2009 | McKinstrie | |
| 7,577,367 B2 * | 8/2009 | Way | 398/183 |
| 7,688,918 B2 | 3/2010 | Koc | |
| 7,711,273 B2 * | 5/2010 | Koc | 398/202 |
| 7,724,421 B2 * | 5/2010 | McKinstrie | 359/333 |
| 7,764,423 B2 * | 7/2010 | McKinstrie et al. | 359/330 |
| 8,032,024 B2 * | 10/2011 | Centanni et al. | 398/48 |

(Continued)

OTHER PUBLICATIONS

"Waveshaper Programmable Optical Processors," www.finisar.com/optical_instrumentation, Finisar WaveShaper S-Series product brief, 2010 (2 pages).

(Continued)

*Primary Examiner* — Daniel Washburn
*Assistant Examiner* — Hibret Woldekidan
(74) *Attorney, Agent, or Firm* — Mendelsohn, Drucker & Dunleavy, P.C.; Yuri Gruzdkov; Steve Mendelsohn (57) ABSTRACT

In one embodiment, the optical transport system has an optical transmitter, an optical receiver, and one or more phase-sensitive amplifiers (PSAs) disposed within an optical link that connects the optical transmitter and receiver. The optical transmitter employs a first nonlinear optical process to generate a two-carrier signal in a manner that makes this signal suitable for phase-sensitive amplification. The PSAs employ a second nonlinear optical process to optically amplify the two-carrier signal in a phase-sensitive manner to counteract the attenuation imposed onto the two-carrier signal by lossy components of the optical link. The optical receiver employs a third nonlinear optical process in a manner that enables the receiver to beneficially use redundancies in the two-carrier signal, e.g., for an SNR gain. The optical transport system can advantageously be implemented to have better noise properties than a comparable conventional system, which enables a commensurate increase in the data-transport capacity.

21 Claims, 5 Drawing Sheets

(56) References Cited

U.S. PATENT DOCUMENTS

| | | | |
|---|---|---|---|
| 8,270,842 B2* | 9/2012 | Watanabe | 398/152 |
| 8,275,263 B1* | 9/2012 | Franklin | 398/92 |
| 2005/0063040 A1* | 3/2005 | Lee et al. | 359/326 |
| 2006/0285197 A1* | 12/2006 | McKinstrie | 359/333 |
| 2007/0206963 A1* | 9/2007 | Koc | 398/202 |
| 2008/0130097 A1* | 6/2008 | McKinstrie | 359/330 |
| 2009/0196619 A1* | 8/2009 | Kim et al. | 398/92 |
| 2009/0303572 A1* | 12/2009 | Grasser et al. | 359/298 |
| 2009/0316738 A1* | 12/2009 | Tournois et al. | 372/21 |
| 2010/0158521 A1 | 6/2010 | Doerr et al. | |
| 2010/0260505 A1* | 10/2010 | Dahan et al. | 398/183 |
| 2011/0038631 A1 | 2/2011 | Doerr | |
| 2013/0155491 A1* | 6/2013 | McKinstrie | 359/326 |

OTHER PUBLICATIONS

Hasegawa, Takasi, et al., "Polarization Independent Frequency Conversion by Fiber Four-Wave Mixing with a Polarization Diversity Technique," IEEE Photon. Technol. Letters, 1993, vol. 5, pp. 947-949.

Jopson, R.M., et al., "Polarization-Independent Phase Conjugation of Lightwave Signals," Electron. Letters, 1993, vol. 29, pp. 2216-2217.

Kakande, Joseph, et al., "Detailed Characterization of a Fiber-Optic Parametric Amplifier in Phasesensitive and Phase-Insensitive Operation," Optics Express, 2010, vol. 18, No. 5, pp. 4130-4137.

McKinstrie, C.J., et al., "Four-Wave Mixing in Fibers with Random Birefringence," Optics Express, 2004, vol. 12, No. 10, pp. 2033-2055.

McKinstrie, C.J., et al., "Four-Wave Mixing in a Rapidly-Spun Fiber," Optics Express, 2006, vol. 14, No. 19, pp. 8516-8534.

McKinstrie, C.J., et al., "Polarization-Independent Amplification and Frequency Conversion in Strongly-Birefringent Fibers," Optics Express, 2008, vol. 16, No. 21, pp. 16774-16797.

Tang, Renyong, et al., "Gain Characteristics of a Frequency Nondegenerate Phase-Sensitive Fiber-Optic Parametric Amplifier with Phase Self-Stabilized Input," Optics Express, 2005, vol. 13, No. 26, pp. 10483-10493.

Tong, Z., et al., "Towards Ultrasensitive Optical Links Enabled by Low-Noise Phase-Sensitive Amplifiers," Nature Photonics, Jun. 5, 2011 (7 pages).

Wang, Zhaoxin, et al., "Polarization-Insensitive Widely Tunable Wavelength Conversion Based on Four-Wave Mixing Using Dispersion-Flattened High-Nonlinearity Photonic Crystal Fiber with Residual Birefringence," Proc. of the 2006, European Conference on Optical Communications paper, We3.P.18, (2 pages).

McGuinness, H.J., et al., "Theory of Quantum Frequency Translation of Light in Optical Fiber: Application to Interference of two Photons of Different Color," Optical Society of America, 2011 (33 pages).

Enloe, L.H. et al., "Laser Phase-Locked Loop," Proc. IEEE, 1965, vol. 53, pp. 165-166.

\* cited by examiner

OPTICAL TRANSPORT SYSTEM FOR TWO-CARRIER SIGNALS

BACKGROUND

1. Field of the Invention

The invention relates to optical communication equipment and, more specifically but not exclusively, to the generation, transmission, and detection of an optical communication signal having two carrier frequencies, such as that suitable for optical phase-sensitive amplification.

2. Description of the Related Art

This section introduces aspects that may help facilitate a better understanding of the invention(s). Accordingly, the statements of this section are to be read in this light and are not to be understood as admissions about what is in the prior art or what is not in the prior art.

A phase-sensitive amplifier (PSA) provides optical-signal amplification while adding very little noise to the signal, with a noise figure of 0 dB (decibels) theoretically shown to be possible. A PSA is also a useful tool for regenerating optical signals and cleaning up signal distortions accumulated in the optical link. A PSA is compatible with various modulation formats and can produce optical gain over a relatively wide spectral range sufficient for WDM (wavelength-division multiplexing) applications. Optical transport systems that can realize in practice these and other benefits of phase-sensitive amplification are being currently developed.

SUMMARY

Disclosed herein are various embodiments of an optical transport system that can leverage optical phase-sensitive amplification of a modulated two-carrier signal to advantageously support a higher information-transmission capacity than that achievable with a comparable conventional optical transport system by up to two bits per second per Hertz. In one embodiment, the optical transport system has an optical transmitter, an optical receiver, and one or more phase-sensitive amplifiers (PSAs) disposed within an optical link that connects the optical transmitter and receiver. The optical transmitter employs a first nonlinear optical process to generate the two-carrier signal in a manner that makes this signal suitable for phase-sensitive amplification. The PSAs employ a second nonlinear optical process to optically amplify the two-carrier signal in a phase-sensitive manner to counteract the attenuation imposed onto the two-carrier signal by lossy components of the optical link. The optical receiver employs a third nonlinear optical process in a manner that enables the receiver to beneficially use redundancies in the two-carrier signal, e.g., for a signal-to-noise ratio (SNR) gain.

According to one embodiment, provided is an apparatus having a nonlinear optical device configured to optically mix, via a first nonlinear optical process, a first modulated optical signal and a second modulated optical signal to generate a first mixed signal and a second mixed signal; and an optical detector configured to generate a first measure and a second measure, said first measure being a measure of the first mixed signal and said second measure being a measure of the second mixed signal. The apparatus further has a signal processor configured to determine a constellation symbol based on the first and second measures; and decode the constellation symbol to determine a corresponding bit word carried by the first and second modulated optical signals.

According to another embodiment, provided is an apparatus comprising an optical transmitter. The optical transmitter comprises an optical modulator configured to modulate an optical carrier with data to generate a first modulated optical signal; and a nonlinear optical device configured to optically mix, via a phase-conjugation (PC) process, the first modulated optical signal, a first optical-pump signal, and a second optical-pump signal to generate a second modulated optical signal. The nonlinear optical device comprises an optical filter configured to optionally separate the first and second modulated optical signals from the first and second optical-pump signals and apply the first and second modulated optical signals to an output port of the optical transmitter.

According to yet another embodiment, provided is an apparatus comprising an optical transmitter. The optical transmitter comprises an optical source configured to generate a first optical carrier and a second optical carrier so that the two optical carriers are phase-locked to one another. The optical transmitter further comprises a first optical modulator and a second optical modulator. The first optical modulator is configured to modulate the first optical carrier with data to generate a first modulated optical signal. The second optical modulator is configured to modulate the second optical carrier with the data to generate a second modulated optical signal in a manner that causes the second modulated optical signal to carry optical symbols that are conjugates of the corresponding optical signals carried by the first modulated optical signal. The optical transmitter further comprises an optical coupler configured to apply the first and second modulated optical signals to an output port of the optical transmitter. In one implementation, the optical source comprises a first laser configured to generate the first optical carrier, a second laser configured to generate the second optical carrier, and a phase-lock circuit configured to cause the first and second lasers to lock the phases of the first and second optical carriers with respect to one another. In another implementation, the optical source comprises an optical fiber amplifier configured to generate the second optical carrier, via a Bragg-scattering (BS) process, using a portion of the optical power of the first optical carrier.

BRIEF DESCRIPTION OF THE DRAWINGS

Other aspects, features, and benefits of various embodiments of the invention will become more fully apparent, by way of example, from the following detailed description and the accompanying drawings, in which.

DETAILED DESCRIPTION

Figure 1:
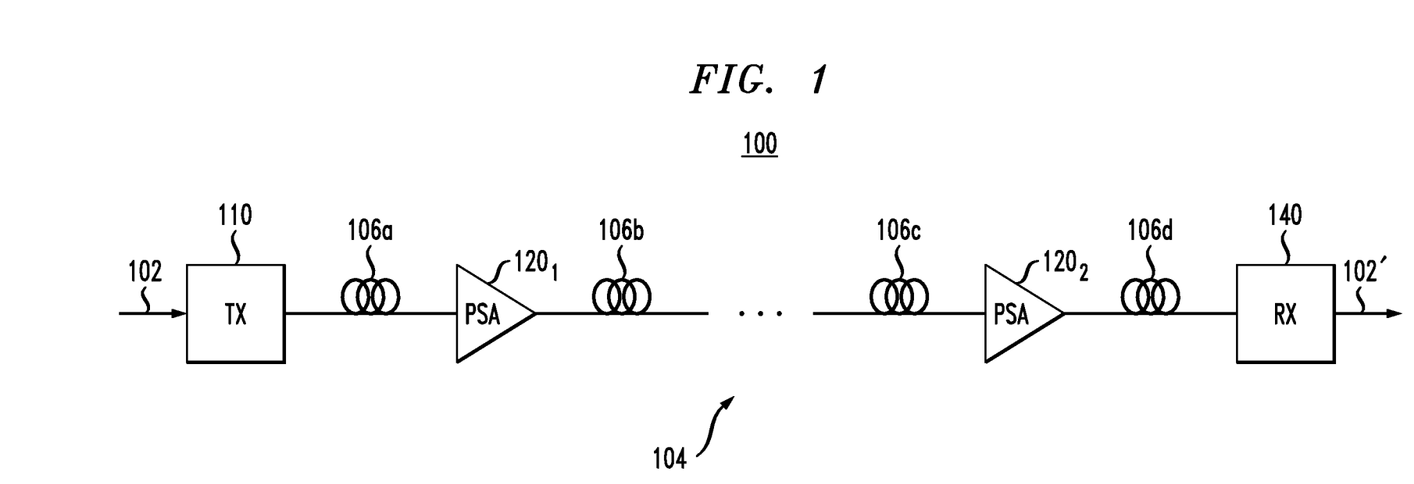
FIG. 1 shows a block diagram of an optical transport system according to one embodiment of the invention.

FIG. 1 shows a block diagram of an optical transport system 100 according to one embodiment of the invention. System 100 has an optical transmitter 110 and an optical receiver 140 connected to one another via an optical transport link 104. Link 104 is illustratively shown as having four sections 106a-106d of optical fiber and two phase-sensitive amplifiers (PSAs) 120₁-120₂. In alternative embodiments, link 104 may have a different number of fiber sections 106 and/or a different number of PSAs 120. Various additional components, such as optical routing elements, variable optical attenuators, optical splitters, optical filters, and the like, may be incorporated into link 104 as appropriate or necessary.

Transmitter 110 is configured to receive an input data stream 102 and generate a corresponding optical output signal that is applied to fiber section 106a to carry the data of the input data stream, via link 104, to receiver 140. Transmitter 110 generates the optical output signal using two different optical carriers. More specifically, transmitter 110 modulates the two optical carriers with the data of data stream 102 in a correlated manner to form a corresponding coherent superposition state that lends itself to phase-sensitive amplification in PSAs 120 of link 104. As the coherent superposition state generated by transmitter 110 propagates along link 104, it becomes a coherent-like superposition state rather than a true coherent state due to the increased noise. A representative two-carrier modulation scheme that can be implemented in transmitter 110 is described in more detail below in reference to FIG. 5.

Each of the two modulated optical carriers of the two-carrier signal launched by transmitter 110 into link 104 carries the same data and can, in principle, be individually demodulated and decoded in a conventional manner to fully recover the data of data stream 102. Therefore, from a conventional point of view, these two modulated optical carriers are redundant. However, the fact that these modulated optical carriers form a superposition quantum state enables system 100 to realize the above-indicated benefits of phase-sensitive amplification. For example, in one embodiment, system 100 can be configured to leverage the beneficial characteristics of the two-carrier signal generated by transmitter 110 and the phase-sensitive amplification provided by PSAs 120 in link 104 to advantageously support a higher information-transmission capacity than that achievable with a comparable conventional optical transport system. More specifically, various embodiments of system 100 can provide an information-transmission-capacity increase of about 1-2 bits per second per Hertz.

FIGS. 2A-2D graphically illustrate representative nonlinear optical processes that can be used in a PSA 120 of system 100 to provide phase-sensitive amplification according to various embodiments of the invention. The nomenclature used in FIGS. 2A-2D adheres to the nomenclature that is conventionally used in nonlinear optics for the description of various optical parametric processes, where p and q denote the optical-pump signals, and s and i denote the "signal" and the "idler," respectively. In the context of this description, signal s and idler i represent the two optical carriers of the two-carrier signal generated by transmitter 110 and directed via optical link 104 to receiver 140 (see FIG. 1).

Figure 2A:
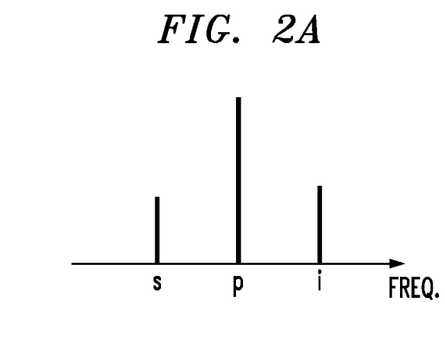
FIGS. 2A-2D show frequency diagrams corresponding to representative nonlinear optical processes that can be used in a phase-sensitive amplifier (PSA) of the optical transport system shown in FIG. 1 according to various embodiments of the invention.

FIG. 2A shows a frequency diagram corresponding to a modulation-interaction (MI) process that can be used in PSA 120 (FIG. 1) according to one embodiment of the invention. Modulation interaction is a degenerate four-wave mixing (FWM) process, in which two pump photons are destroyed, and one signal photon and one idler photon are created, e.g., $2\pi_p \rightarrow \pi_s + \pi_i$, where $\pi_x$ represents a corresponding photon with frequency $\omega_x$ (x=p, s, i).

Figure 2B:
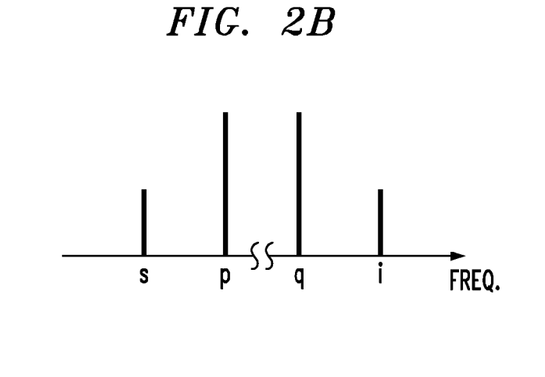
Figure 2C:
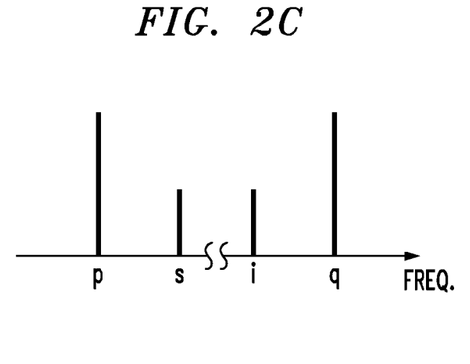

FIGS. 2B-2C show frequency diagrams corresponding to phase-conjugation (PC) processes that can be used in PSA 120 according to another embodiment of the invention. Phase conjugation is a non-degenerate FWM process, in which one photon from each of two pumps is destroyed, and one signal photon and one idler photon are created, e.g., $\pi_p + \pi_q \rightarrow \pi_s + \pi_i$, where $\pi_x$ represents a corresponding photon (x=q, p, s, i). In the two flavors of phase conjugation shown in FIGS. 2B and 2C, respectively, both the signal and the idler frequencies are either outside of the frequency range between the two pumps (FIG. 2B) or inside that frequency range (FIG. 2C). Additional description of representative two-pump phase-conjugation processes can be found, e.g., in U.S. Pat. No. 7,164,526, which is incorporated herein by reference in its entirety.

Figure 2D:
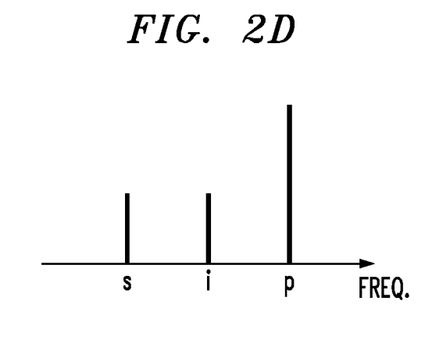

FIG. 2D shows a frequency diagram corresponding to a non-degenerate down-conversion (DC) process that can be used in PSA 120 according to yet another embodiment of the invention. Down-conversion is a three-wave-mixing (TWM) process, in which one pump photon is destroyed, and one signal photon and one idler photon are created, e.g., $\pi_p \rightarrow \pi_s + \pi_i$, where $\pi_x$ represents a corresponding photon (x=p, s, i).

Referring back to FIG. 1, in operation, PSA 120 receives, from the upstream fiber section 106, a two-carrier signal, with the two modulated optical carriers of that signal serving as the "signal" and "idler" modes, respectively. PSA 120 then applies the received two-carrier signal, together with one or two optical pumps, to an appropriate nonlinear optical medium to cause energy transfer from the optical pump(s) to the modulated carriers, e.g., via one of the nonlinear optical processes shown in FIGS. 2A-2D, thereby amplifying the modulated carriers in a phase-sensitive manner. At the output port of PSA 120, the amplified two-carrier signal may be separated out from the optical pump(s), e.g., using an appropriate optical filter or dispersive spectral element (not explicitly shown in FIG. 1). The separated amplified two-carrier signal may then be applied to the downstream fiber section 106 for further transmission through link 104. In an alternative configuration, the optical pump(s) may be applied to the downstream fiber section 106 together with the amplified two-carrier signal.

In various embodiments, PSA 120 can be a distributed fiber-based amplifier or a lumped optical amplifier. A representative PSA that can be used as PSA 120 in system 100 is disclosed, e.g., in U.S. Pat. No. 7,483,203, which is incorporated herein by reference in its entirety.

In one embodiment, receiver 140 uses a conventional homodyne or intradyne signal-detection scheme to recover the data of data stream 102 based on the two-carrier signal received from link 104. More specifically, receiver 140 is configured to select one of the modulated carriers of the two-carrier signal and discard (e.g., block or drop) the other. The selected modulated carrier is then demodulated and decoded, e.g., by (i) optically splitting it into two attenuated copies, for example, in a balanced (50/50) optical beam splitter; (ii) mixing each of the copies with an appropriately phase-shifted local-oscillator signal to measure the in-phase (I) and quadrature-phase (Q) components of the modulated carrier; (iii) mapping the resulting (I,Q) pair onto the appropriate constellation to determine the symbol carried by the modulated carrier in the corresponding time slot; and (iv) decoding the symbol to recover the corresponding bit word (fragment) of data stream 102. Either the "signal" or the "idler" mode can be selected for demodulation and decoding in this embodiment of receiver 140. The recovered data fragments are concatenated to generate an output data stream 102', which is directed to external circuitry. Representative optical receivers that can be used to implement this embodiment of receiver 140 are disclosed, e.g., in U.S. Patent Application Publication Nos. 2010/0158521 and 2011/0038631, and U.S. Pat. Nos. 7,688,918 and 7,711,273, all of which are incorporated herein by reference in their entirety.

Note that the use of an optical splitter and concomitant detection of attenuated signal copies in the above-described signal-detection scheme imposes an automatic signal-to-noise ratio (SNR) penalty of up to 3 dB. However, in an alternative signal-detection scheme that can be implemented in another embodiment of receiver 140, this SNR penalty can be obviated through the use of both modulated carriers (i.e., both the "signal" and the "idler" modes) of the received two-carrier signal for data recovery. More specifically, in this particular embodiment, receiver 140 is configured to mix the modulated carriers of the received two-carrier signal in a nonlinear optical medium using a Bragg-scattering (BS) process, a non-degenerate FWM process, in which one photon from one of the two pumps and one signal photon are destroyed, and one idler photon and one photon for the other pump are created, e.g., $\pi_s + \pi_q \to \pi_p + \pi_i$, where $\pi_x$ represents a corresponding photon (x=q, p, s, i). Receiver 140 uses the BS process to mix the modulated carriers so that (i) the mixed signal having the first carrier frequency (e.g., that of the "signal" mode) primarily carries the I component of the original modulation signal and (ii) the mixed signal having the second carrier frequency (e.g., that of the "idler" mode) primarily carries the Q component of the original modulation signal. Each of these mixed optical signals is detected in receiver 140 to recover the corresponding (I,Q) pair. The recovered (I,Q) pair is then constellation-mapped and decoded in a conventional manner to recover the corresponding fragment of data stream 102.

Below, a brief theoretical analysis of the latter signal-detection scheme is presented first. A practical implementation of this scheme is then described in more detail in reference to FIGS. 3 and 4A-4B.

Let $a_1$ and $a_2$ denote the first and second modulated carriers, respectively, of the two-carrier signal received by PSA $120_2$ from fiber section 106c, and let $b_1$ and $b_2$ denote the amplified modulated carriers directed by the PSA to receiver 140 (see FIG. 1). Then, assuming no loss in fiber section 106d, one can write:

$$b_1 = \mu a_1 + \nu a^*_2 \quad (1a)$$

$$b_2 = \nu a^*_1 + \mu a_2 \quad (1b)$$

where $\mu$ and $\nu$ are the transfer coefficients of the PSA, and $|\mu|^2 - |\nu|^2 = 1$. Let $c_1$ and $c_2$ denote the mixed signals produced by the optical Bragg-scattering (BS) mixer (also often referred to as "frequency converter") in receiver 140. Then:

$$c_1 = \tau b_1 + \rho b_2 \quad (2a)$$

$$c_2 = -\rho^* b_1 + \tau^* b_2 \quad (2b)$$

where $\tau$ and $\rho$ are the transfer coefficients of the frequency converter, and $|\tau|^2 + |\rho|^2 = 1$. By combining Eqs. (1) and (2), one finds that:

$$c_1 = (\tau\mu)a_1 + (\rho\nu)a^*_1 + (\rho\mu)a_2 + (\tau\nu)a^*_2 \quad (3a)$$

$$c_2 = -(\rho^*\mu)a_1 + (\tau^*\nu)a^*_1 + (\tau^*\mu)a_2 - (\rho^*\nu)a^*_2 \quad (3b)$$

To demonstrate the proof of principle, we will now analyze Eqs. (3a)-(3b) by assuming that the transfer coefficients are all real and positive. If one treats the operators in Eqs. (3a)-(3b) like complex numbers and lets $a_j = a_{jr} + i a_{ji}$, where the subscripts r and i denote the real and imaginary parts, respectively, and j=1, 2, then, for real positive transfer coefficients, Eqs. (3a) and (3b) can be rewritten as:

$$c_{1r} = (\tau\mu + \rho\nu)a_{1r} + (\rho\mu + \tau\nu)a_{2r} \quad (4a)$$

$$c_{1i} = (\tau\mu - \rho\nu)a_{1i} + (\rho\mu - \tau\nu)a_{2i} \quad (4b)$$

$$c_{2r} = (\tau\nu - \rho\mu)a_{1r} + (\tau\mu - \rho\nu)a_{2r} \quad (4c)$$

$$c_{2i} = -(\tau\nu + \rho\mu)a_{1i} + (\tau\mu + \rho\nu)a_{2i} \quad (4d)$$

It is evident from Eqs. (4a)-(4d) that, for the first mixed signal ($c_1$) in receiver 140, the real quadrature is stretched and the imaginary quadrature is squeezed, whereas for the second mixed signal ($c_2$), the real quadrature is squeezed and the imaginary quadrature is stretched. One of ordinary skill in the art will understand that, for a high-gain PSA (e.g., $\mu+\nu \gg 1$ and $\mu-\nu \ll 1$) and a balanced frequency converter ($\tau^2 = \rho^2 = \frac{1}{2}$), the squeezed quadratures are negligible because the detector noise swamps the diminished input noise and also likely swamps the diminished communication signal. In contrast, the stretched quadratures are readily detectable because the amplified input noise (which is presumably relatively low compared to the amplified communication signal) swamps the detector noise.

These results imply that the I component of the original modulated signal can be recovered by applying homodyne or intradyne detection to the first mixed signal. The Q component of the original modulated signal can similarly be recovered by applying homodyne or intradyne detection to the second mixed signal. Note that the first and second mixed signals have the first carrier frequency and the second carrier frequency, respectively, and, as such, can be spatially separated from one another in receiver 140 in a relatively straightforward manner, e.g., using a dispersive spectral element, such as a prism or a grating. Each of the separated mixed signals can then be directed to a respective homodyne or intradyne detector for optical-to-electrical conversion and post-conversion processing in the electrical domain.

Note that the amplitude of the real quadrature of the first mixed signal ($c_{1r}$, Eq. (4a)) is maximal if $a_{2r} = a_{1r}$. The amplitude of the imaginary quadrature of the second mixed signal ($c_{2i}$, Eq. (4d)) is maximal if $a_{2i} = -a_{1i}$. These two results suggest a modulation scheme that can be implemented in transmitter 110 to generate the corresponding original two-carrier signal in an optimal manner. A representative example of such a modulation scheme is described below in reference to FIG. 5.

For complex transfer coefficients $\mu$, $\nu$, $\tau$, and $\rho$, the analysis of Eqs. (3a)-(3b) is significantly more complex and, for the sake of brevity, is not provided here. However, the major conclusions derived from the above-presented analysis of the special case of all-real transfer coefficients remain valid. More specifically, provided that a particular relationship exists between the phases of the first and second modulated carriers ($a_1$ and $a_2$) of the two-carrier signal, the optical BS mixer of receiver 140 will convert (i) the I components of the two carriers that are in phase with one another (e.g., have the same sign) to the first carrier frequency and (ii) the Q components of the two carriers that are out of phase with one another (e.g., have opposite signs) to the second carrier frequency. The resulting mixed signals can then be separated from one another and individually detected as already indicated above.

Figure 3:
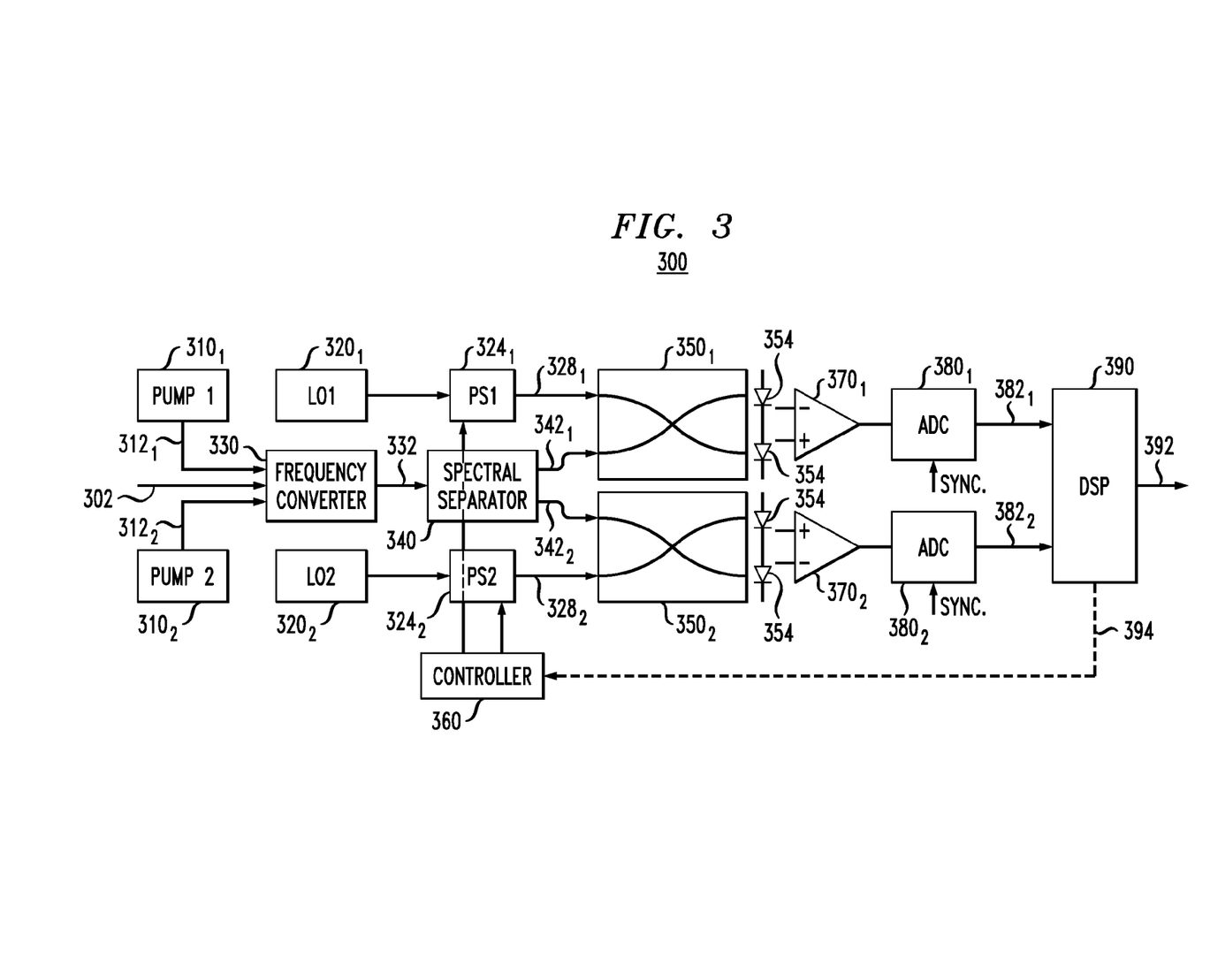
FIG. 3 shows a block diagram of an optical receiver that can be used in the optical transport system of FIG. 1 according to one embodiment of the invention.

FIG. 3 shows a block diagram of an optical receiver 300 that can be used as receiver 140 according to one embodiment of the invention. Receiver 300 is configured to receive a two-carrier input signal 302, e.g., from PSA $120_2$ (see FIG. 1). Receiver 300 is further configured to process signal 302, e.g., as described below, to generate an output data stream 392 that can serve as output data stream 102' in system 100 (FIG. 1).

Receiver 300 has an optical frequency converter (BS signal mixer) 330 that receives as inputs (i) two-carrier signal 302 and (ii) optical-pump signals $312_1$ and $312_2$ generated by optical-pump sources (e.g., lasers) $310_1$ and $310_2$, respectively. The wavelengths (frequencies) of optical-pump signals $312_1$ and $312_2$ are selected to enable the two carriers of signal 302 and the two optical-pump signals to optically mix, via a Bragg-scattering (BS) process, in the corresponding nonlinear optical medium of optical frequency converter 330.

Figure 4A:
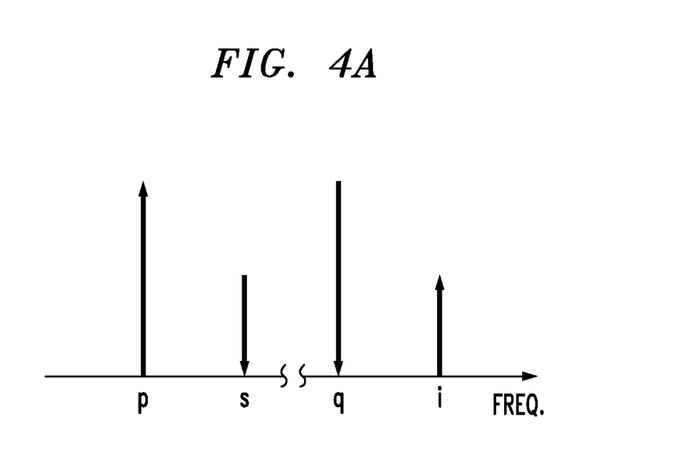
FIGS. 4A-4B show frequency diagrams corresponding to a Bragg-scattering process that can be used in an optical frequency converter of the optical receiver of FIG. 3 according to one embodiment of the invention.
Figure 4B:
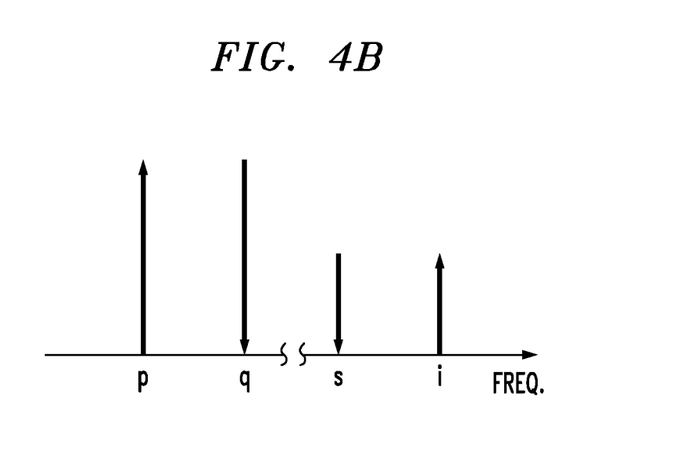

FIGS. 4A-4B show frequency diagrams corresponding to two different flavors of the BS process that can be used in optical frequency converter 330. Note that FIGS. 4A-4B adhere to the same nomenclature as FIGS. 2A-2D.

As already indicated above, Bragg scattering is a non-degenerate FWM process, in which one photon from one of the two pumps and one signal photon are destroyed, and one idler photon and one photon for the other pump are created, e.g., $\pi_s + \pi_q \rightarrow \pi_p + \pi_i$, where $\pi_x$ represents a corresponding photon (x=q, p, s, i). In the frequency diagrams of FIGS. 4A-4B, downward arrows denote the optical modes that lose photons in the corresponding BS process, whereas upward arrows denote the optical modes that gain photons in that process. The BS-process flavor shown in FIG. 4A is sometimes referred to as distant Bragg scattering because the signal and idler can have a relatively large spectral separation due to the presence of one of the optical pumps in the spectral range between them. The BS-process flavor shown in FIG. 4B is sometimes referred to as nearby Bragg scattering because the signal and idler are located next to each other on the same side of the optical-pump pair.

Referring back to FIG. 3, a multiplex 332 of mixed optical signals produced by optical frequency converter 330 is applied to an input port of a spectral separator 340. Spectral separator 340 is configured to (i) block or dump the mixed signals having the optical-pump frequencies, (ii) direct a mixed signal $342_1$ having the first carrier frequency to a first output port, and (ii) direct a mixed signal $342_2$ having the second carrier frequency to a second output port. In various embodiments, separator 340 can be based on a prism, a grating, an optical de-multiplexer, a dichroic filter, or any other suitable optical device designed to spatially separate light of different colors.

Mixed signals $342_1$ and $342_2$ are applied to optical mixers $350_1$ and $350_2$, respectively, as indicated in FIG. 3. Optical mixer $350_1$ also receives an appropriately phase-shifted local-oscillator (LO) signal $328_1$ produced by a local-oscillator source (LO1) $320_1$ and a phase shifter (PS1) $324_1$. Optical mixer $350_2$ similarly receives an appropriately phase-shifted LO signal $328_2$ produced by a local-oscillator source (LO2) $320_2$ and a phase shifter (PS2) $324_2$. LO signals $328_1$ and $328_2$ have frequencies corresponding to the first and second carrier frequencies, respectively, of two-carrier signal 302. As used here, the word "corresponding" means that the frequencies in each pair are sufficiently close to each other to enable homodyne or intradyne signal detection. A controller 360 controls the phase shifts imparted by phase shifters $324_1$ and $324_2$, e.g., to align (i) LO signal $328_1$ with the I quadrature of mixed signal $342_1$ and (ii) LO signal $328_2$ with the Q quadrature of mixed signal $342_2$.

Each of optical mixers $350_1$ and $350_2$ operates to combine its input signals to produce two corresponding interference signals, each having an intensity that is: (i) proportional to the intensities of the input signals and (ii) related to an instant phase offset between those input signals. More specifically, the interference signals produced by optical mixer 350 are such that the intensity difference between these interference signals is proportional to $\cos(\Delta\phi)$, where $\Delta\phi$ is the instant phase offset. A pair of balanced photo-detectors (e.g., photo-diodes) 354 coupled to a respective one of differential amplifiers $370_1$ and $370_2$ continuously measures the intensity difference for the interference signals produced by the respective one of optical mixers $350_1$ and $350_2$ and applies the measurement results to a respective one of synchronized analog-to-digital converters (ADCs) $380_1$ and $380_2$. Using these measurement results, each of ADCs $380_1$ and $380_2$ produces a respective one of digital signals $382_1$ and $382_2$, both of which are applied to a digital signal processor (DSP) 390.

One of ordinary skill in the art will understand that digital signal $382_1$ provides a measure of the I component of the original modulation signal, and that digital signal $382_2$ similarly provides a measure of the Q component of the original modulation signal. DSP 390 processes digital signals $382_1$ and $382_2$ to obtain, for each time slot, a respective (I,Q) pair. DSP 390 then maps each (I,Q) pair onto the operative constellation to determine the constellation symbol carried by input signal 302 in the corresponding time slot. Finally, DSP 390 decodes each of the determined constellation symbols to produce a corresponding bit word and then concatenates the bit words to generate output data stream 392.

In one embodiment, DSP 390 is also configured to generate a feedback signal 394 for controller 360. Feedback signal 394 can be generated, e.g., based on the average energy of each of digital signals $382_1$ and $382_2$, with the averages being repeatedly taken over a fixed-width time window that covers a relatively large number of signal time slots. Controller 360 can then use the average energy of digital signal $382_1$ to adjust the phase shift imparted by phase shifter $324_1$ to keep the average energy near a maximum level, thereby maintaining a proper phase alignment between signals $328_1$ and $342_1$. Controller 360 can similarly use the average energy of digital signal $382_2$ to adjust the phase shift imparted by phase shifter $324_2$ to maintain a proper phase alignment between signals $328_2$ and $342_2$.

Figure 5:
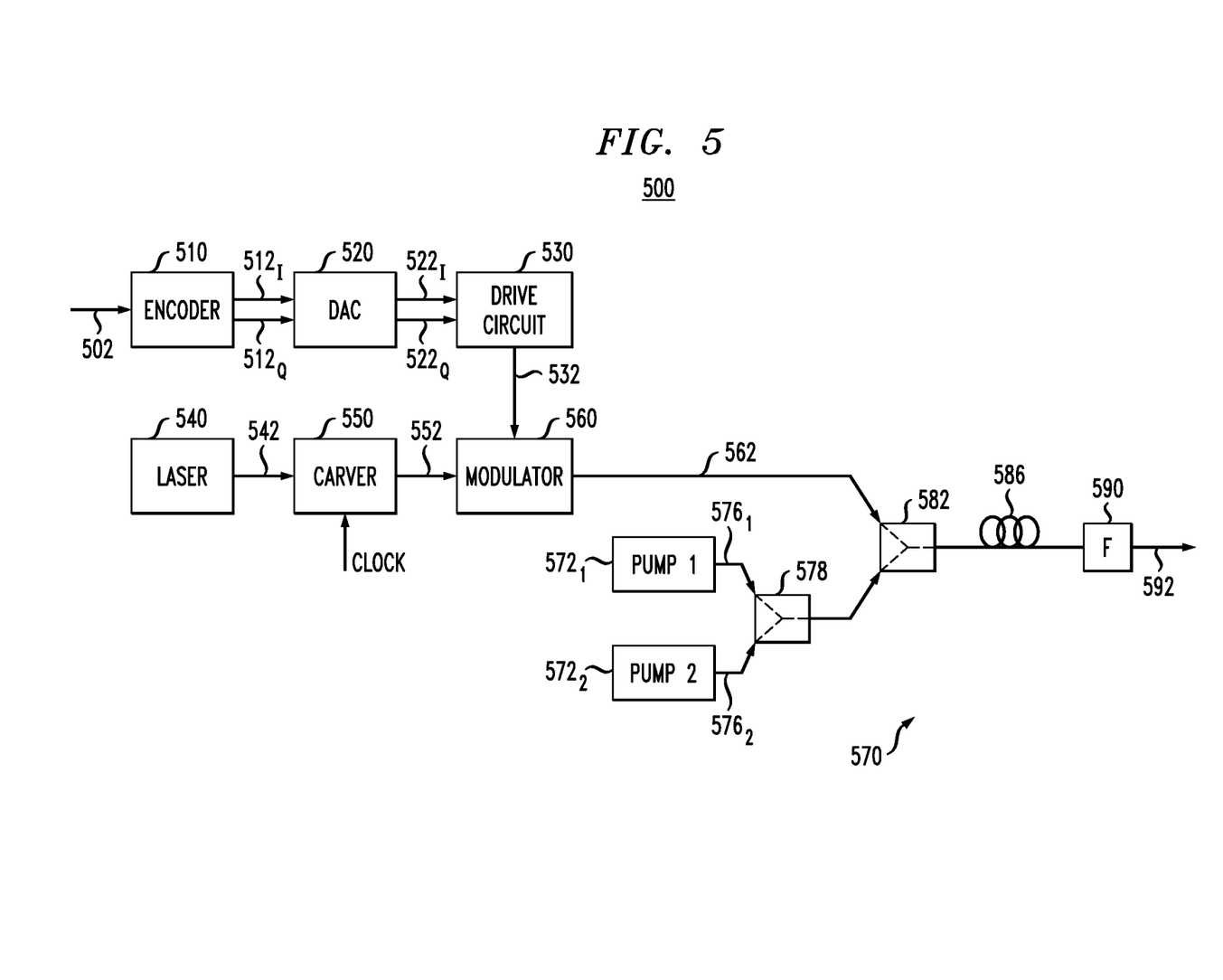
FIG. 5 shows a block diagram of an optical transmitter that can be used in the optical transport system of FIG. 1 according to one embodiment of the invention.

FIG. 5 shows a block diagram of an optical transmitter 500 that can be used as transmitter 110 (FIG. 1) according to one embodiment of the invention. Transmitter 500 is configured to receive an input data stream 502 that can be, e.g., input data stream 102 (FIG. 1). Transmitter 500 is further configured to generate, e.g., as described below, a two-carrier optical output signal 592 that carries the data of input data stream 502. Signal 592 can be applied, e.g., to fiber section 106a for transmission through link 104 in system 100 (FIG. 1).

Transmitter 500 has an encoder 510 configured to transform input data stream 502 into a corresponding sequence of constellation symbols and provide the (I,Q) pair representing each constellation symbol to a digital-to-analog converter (DAC) 520 via signals $512_I$ and $512_Q$, wherein, in each time slot, signal $512_I$ has the I value of the corresponding (I,Q) pair, and signal $512_Q$ has the Q value of that pair. DAC 520 transforms signals $512_I$ and $512_Q$ into the corresponding electrical analog signals $522_I$ and $522_Q$ and applies those signals to a drive circuit 530. Based on signals $522_I$ and $522_Q$, drive circuit 530 generates, as known in the art, one or more appropriate drive signals 532 and applies those drive signals to an optical modulator 560.

Drive signal(s) 532 drive(s) modulator 560 thereby causing it to modulate an optical input signal 552 and convert the latter into a modulated optical signal 562. Optical signal 552 is a pulse train that is generated by a pulse carver 550, e.g., by gating, at a specified clock rate, a CW optical beam 542 generated by a laser 540. Laser 540 is configured to generate beam 542 so that the beam has a first carrier frequency intended for two-carrier output signal 592. One of ordinary skill in the art will understand that modulated optical signal 562 has the same carrier frequency as beam 542.

Modulated optical signal 562 is applied to an optical fiber amplifier (OFA) 570, where it is converted into two-carrier output signal 592 as further described below. In various configurations, OFA 570 can be operated with one or two optical-pump signals $576_1$ and $576_2$. In a one-pump configuration, one of optical-pump sources $572_1$ and $572_2$ can be turned off. In a two-pump configuration, both optical-pump sources $572_1$ and $572_2$ are turned on.

OFA 570 has two optical couplers 578 and 582 that are configured to combine signals 562, $576_1$, and $576_2$ and couple the resulting multiplexed signal into a highly nonlinear fiber (HNLF) 586. An appropriate nonlinear optical process in HNLF 586 then produces a "copy" of modulated optical signal 562, with said copy having a second carrier frequency intended for two-carrier signal 592. An optical filter 590 placed at the distal end of HNLF 586 separates signal 562 and its "copy" generated in the HNLF from optical-pump signals $576_1$ and $576_2$, thereby producing two-carrier signal 592. A representative OFA that can be configured to operate as OFA 570 in transmitter 500 is described in more detail, e.g., in the above-cited U.S. Pat. No. 7,164,526.

In one embodiment, HNLF 586 is a fiber that is designed and configured to enable therein a modulation-interaction (MI) process that is analogous to the MI process depicted in FIG. 2A. Since the MI process can be implemented with a single optical-pump signal (the "p" mode in FIG. 2A), one of optical-pump sources $572_1$ and $572_2$ can be turned off or removed from transmitter 500. The other optical-pump source is configured to generate the corresponding optical-pump signal 576 at an optical frequency (wavelength) that causes the MI process in HNLF 586 to generate photons at the second carrier frequency of two-carrier signal 592. In the frequency diagram of FIG. 2A, the first and second carrier frequencies of signal 592 are represented by the "s" and "i" modes. In different configurations, modulated optical signal 562 can correspond to either the "s" mode or the "i" mode. For example, if modulated optical signal 562 corresponds to the "s" mode of FIG. 2A, then the MI process in HNLF 586 generates the "i" mode. Alternatively, if modulated optical signal 562 corresponds to the "i" mode of FIG. 2A, then the MI process in HNLF 586 generates the "s" mode. Note that the MI process implemented in HNLF 586 differs from the MI process implemented in the corresponding embodiment of PSA 120 (FIG. 1) in that the PSA is configured to receive, as input signals, both the "s" and "i" modes of FIG. 2A, whereas the HNLF is configured to receive only one of those modes. Additional details on copying optical signals via an MI process can be found, e.g., in Renyong Tang, Jacob Lasri, Preetpaul S. Devgan, et al., "Gain Characteristics of a Frequency Nondegenerate Phase-Sensitive Fiber-Optic Parametric Amplifier with Phase Self-Stabilized Input," OPTICS EXPRESS, 2005, vol. 13, No. 26, pp. 10483-10493, which is incorporated herein by reference in its entirety.

In another embodiment, HNLF 586 is a fiber that is designed and configured to enable therein a phase-conjugation (PC) process that is analogous to one of the PC processes depicted in FIGS. 2B-2C. Since the PC process employs two optical-pump signals (the "p" and "q" modes in FIGS. 2B-2C), both optical-pump sources $572_1$ and $572_2$ are turned on and configured to generate optical-pump signals $576_1$ and $576_2$ at respective optical frequencies (wavelengths) that cause the corresponding PC process in HNLF 586 to generate photons at the second carrier frequency of two-carrier signal 592. For example, if modulated optical signal 562 corresponds to the "s" mode of one of FIGS. 2B-2C, then the PC process in HNLF 586 generates the "i" mode. Alternatively, if modulated optical signal 562 corresponds to the "i" mode of one of FIGS. 2B-2C, then the PC process in HNLF 586 generates the "s" mode. Again, the PC process implemented in HNLF 586 differs from the PC process implemented in the corresponding embodiment of PSA 120 (FIG. 1) in that the PSA is configured to receive, as input signals, both the "s" and "i" modes of FIG. 2B or 2C, whereas the HNLF is configured to receive only one of those modes.

Note that, for both of the above-described embodiments of OFA 570, transmitter 500 may need to incorporate, at its output port, an optical phase controller or optical processor (e.g. a Finisar Waveshaper, not explicitly shown in FIG. 5) so that two-carrier signal 592 generated by transmitter 500 has appropriate characteristics to: (i) lend itself to phase-sensitive amplification in link 104 (FIG. 1), and (ii) enable proper operation of receiver 300 (FIG. 3) at the remote end of that link. Either the MI process or the PC process implemented in OFA 570 in the above-described manner can cause the "copy" of modulated optical signal 562 generated in HNLF 586 to have an optimal relationship with that modulated optical signal for these purposes. For example, recall that the above-presented analysis of Eqs. (4a)-(4d) suggested the following possible optimal relationship for the quadratures of the two-carrier signal: $a_{2r}=a_{1r}$ and $a_{2i}=-a_{1i}$. One of ordinary skill in the art will appreciate that either the MI process or the PC process in HNLF 586 is capable of producing signals that can be processed to have this particular relationship for two-carrier signal 592. One or more additional instances of a similar optical phase controller or optical processor may need to be incorporated into link 104 before and/or after each amplifier 120.

One of ordinary skill in the art will further appreciate that system 100 can employ various alternative embodiments of transmitter 110 (FIG. 1), e.g., an optical transmitter that is different from transmitter 500 but is still able to generate the first and second modulated carriers so that $a_2=a_1{}^*$, where $a_1$ and $a_2$ denote the first and second modulated carriers, respectively.

For example, a first alternative embodiment of transmitter 110 can be constructed by modifying transmitter 500 of FIG. 5 as follows.

First, all elements shown in FIG. 5 downstream from modulator 560 are removed. The removed elements include optical-pump sources $572_1$ and $572_2$ and OFA 570.

Second, a second optical branch is added in parallel to the optical branch having laser 540, pulse carver 550, optical modulator 560, and drive circuit 530. This second optical branch is analogous to the existing optical branch and includes its own laser, pulse carver, optical modulator, and drive circuit.

Third, a phase-lock circuit is added and configured to lock the phases of the optical output beams generated by laser 540 and the laser of the second (added) optical branch. One circuit that can operate as such phase-lock circuit is disclosed, e.g., in L. H. Enloe and J. L. Rodda, "Laser Phase-Locked Loop," Proc. IEEE, vol. 53, pp. 165-166 (1965), which is incorporated herein by reference in its entirety.

Fourth, the drive circuit of the second (added) optical branch is connected to receive, as input signals, a copy of electrical analog signal $522_I$ and an inverted copy of electrical analog signal $522_Q$. The inversion of signal $522_Q$ can be implemented using a conventional signal inverter, e.g., a differential amplifier configured to (i) receive signal $522_Q$ at its inverting input port and (ii) operate with a gain of one.

Finally, an optical combiner that is similar to combiner 582 is added to combine the optical signals generated by the two optical branches. The optical output signal generated by the optical combiner has the requisite characteristics and can be used in the same way as output signal 592.

A second alternative embodiment of transmitter 110 can be constructing by further modifying the just-described first alternative embodiment, e.g., by replacing the laser of the second optical branch with an optical fiber amplifier that is similar to OFA 570, but is configured to operate using a Bragg-scattering (BS) process. When a (diverted) portion of CW optical beam 542 is applied, as an input signal, to that optical fiber amplifier, the BS process therein produces an idler that is a direct (non-conjugated) copy of the input signal. Then, the two modulators of the above-described two optical branches can be used to impart conjugate information (I and Q, and I and –Q), on the non-diverted portion of beam 542 and on the idler generated by the optical fiber amplifier, respectively. After being combined in an optical combiner, the two modulated signals form a requisite two-carrier signal that can be used in the same way as output signal 592.

Referring back to FIG. 1, in one embodiment, MI- or PC-based optical-signal copying in transmitter 110, phase-sensitive amplification in PSAs 120, and BS-based frequency conversion in receiver 140 are all implemented in polarization-independent manners. More specifically, there are three main types of nonlinear media that are currently available for the implementation of MI, PC, and BS processes: (i) randomly birefringent fiber (RBF), (ii) rapidly spun fiber (RSF), and (iii) strongly birefringent fiber (SBF). MI is generally polarization sensitive in RBF and RSF. However, one can make it polarization insensitive by using a polarization-diversity scheme similar to that disclosed in an article by T. Hasegawa, K. Inoue, and K. Oda, entitled "Polarization Independent Frequency Conversion by Fiber Four-Wave Mixing with a Polarization Diversity Technique," published in IEEE Photon. Technol. Letters, 1993, v. 5, pp. 947-949, which article is incorporated herein by reference in its entirety. This scheme can also be adapted, in a relatively straightforward manner, to make PC and BS processes polarization insensitive.

PC and BS driven in RBF or RSF by optical pumps with parallel polarizations are polarization sensitive. However, PC driven by orthogonal pumps in RBF is intrinsically polarization independent (see, e.g., R. M. Jopson and R. E. Tench, "Polarization-Independent Phase Conjugation of Lightwave Signals," Electron. Letters, 1993, v. 29, pp. 2216-2217, and C. J. McKinstrie, H. Kogelnik, R. M. Jopson, S. Radic, and A. V. Kanaev, "Four-Wave Mixing in Fibers with Random Birefringence," Opt. Express, 2004, v. 12, pp. 2033-2055, which are incorporated herein by reference in their entirety). This property of RBF is advantageous for a two-pump design. PC driven by perpendicular linearly polarized pumps or counter-rotating circularly polarized pumps in RSF is also polarization independent (see, e.g., C. J. McKinstrie, H. Kogelnik, and L. Schenato, "Four-Wave Mixing in a Rapidly-Spun Fiber," Opt. Express 2006, v. 14, pp. 8516-8534, which is incorporated herein by reference in its entirety). BS driven by co-rotating circularly polarized pumps in RSF is polarization independent (see the above-cited Opt. Express 2006, v. 14, pp. 8516-8534).

One can make MI in SBF polarization independent by using a linearly polarized pump that is inclined at 45 degrees to the birefringence axes (see, e.g., Z. Wang, N. Deng, C. Lin, and C. K. Chan, "Polarization-Insensitive Widely Tunable Wavelength Conversion Based on Four-Wave Mixing Using Dispersion-Flattened High-Nonlinearity Photonic Crystal Fiber with Residual Birefringence," Proc. of the 2006 European Conference on Optical Communications, paper We3.P.18, which is incorporated herein by reference in its entirety). One can also make PC and BS in SBF polarization independent by using two linearly polarized pumps that are inclined at 45 degrees to the birefringence axes (see, e.g., C. J. McKinstrie and C. Xie, "Polarization-Independent Amplification and Frequency Conversion in Strongly-Birefringent Fibers," Opt. Express, 2008, v. 16, pp. 16774-16797, and U.S. Pat. No. 7,764,423, which are incorporated herein by reference in their entirety).

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors" and "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

What is claimed is:

1. An apparatus, comprising:
   a nonlinear optical device configured to optically mix, via a first nonlinear optical process, a first modulated optical signal and a second modulated optical signal to generate a first mixed signal and a second mixed signal;
   an optical detector configured to generate a first measure and a second measure, said first measure being a measure of the first mixed signal and said second measure being a measure of the second mixed signal; and
   a signal processor configured to:
      determine a constellation symbol based on the first and second measures; and
      decode the constellation symbol to determine a corresponding bit word carried by the first and second modulated optical signals; and
   wherein the first nonlinear optical process is a Bragg-scattering process; and
   wherein the nonlinear optical device is configured to optically mix, via the Bragg-scattering process, the first modulated optical signal, the second modulated optical signal, a first optical-pump signal, and a second optical-pump signal, with the first mixed signal and the second mixed signal being generated via said mixing.

2. The apparatus of claim 1, wherein:
   each of the first modulated optical signal and the first mixed signal has a first carrier frequency; and
   each of the second modulated optical signal and the second mixed signal has a second carrier frequency different from the first carrier frequency.

3. The apparatus of claim 2, further comprising:
   a first optical-pump source configured to generate the first optical-pump signal and apply it to the nonlinear optical device; and
   a second optical-pump source configured to generate the second optical-pump signal and apply it to the nonlinear optical device.

4. The apparatus of claim 1, wherein the signal processor is configured to map an (I,Q) pair onto a corresponding constellation to determine the constellation symbol, wherein the first measure and the second measure are the I- and Q-values, respectively, of said (I,Q) pair.

5. The apparatus of claim 1, wherein the optical detector comprises:
   a first optical mixer configured to optically mix the first mixed signal with a first local-oscillator (LO) signal to generate first and second optical interference signals, wherein the first LO signal has a carrier frequency corresponding to a carrier frequency of the first modulated optical signal;
   a second optical mixer configured to optically mix the second mixed signal with a second LO signal to generate third and fourth optical interference signals, wherein the second LO signal has a carrier frequency corresponding to a carrier frequency of the second modulated optical signal and different from the carrier frequency of the first LO signal; and
   an optical-to-electrical converter configured to convert (i) the first and second optical interference signals into the first measure and (ii) the third and fourth interference signals into the second measure.

6. The apparatus of claim 5, further comprising:
   a first phase shifter configured to controllably phase-shift the first LO signal; and
   a phase-shift controller configured to control the first phase shifter based on a feedback signal generated by the signal processor based on the first measure.

7. The apparatus of claim 6, further comprising:
   a second phase shifter configured to controllably phase-shift the second LO signal; and
   wherein the phase-shift controller is further configured to control the second phase shifter based on a feedback signal generated by the signal processor based on the second measure.

8. The apparatus of claim 5, further comprising an optical signal separator coupled between the nonlinear optical device and the first and second optical mixers and configured to:
   separate the first mixed signal and the second mixed signal;
   apply the separated first mixed signal to the first optical mixer; and
   apply the separated second mixed signal to the second optical mixer.

9. The apparatus of claim 1, further comprising a phase-sensitive amplifier (PSA) configured to generate the first and second modulated optical signals via a second nonlinear optical process, said second nonlinear optical process being one of a set consisting of a modulation-interaction (MI) process, a phase-conjugation (PC) process, and a down-conversion (DC) process.

10. The apparatus of claim 9, further comprising an optical transmitter configured to:
    modulate an optical carrier to generate a third modulated optical signal; and
    optically mix, via a third nonlinear optical process, the third modulated optical signal and at least a first optical-pump signal to generate a fourth modulated optical signal, wherein:
       each of the first and third modulated optical signals has a first carrier frequency;
       each of the second and fourth modulated optical signals has a second carrier frequency different from the first carrier frequency; and
       the PSA is configured to generate the first and second modulated optical signals based on the third and fourth modulated optical signals.

11. The apparatus of claim 10, wherein the third nonlinear optical process is one of a set consisting of a modulation-interaction (MI) process or a phase-conjugation (PC) process.

12. The apparatus of claim 1, further comprising an optical-transport link coupled to an input port of the nonlinear optical device and configured to generate the first and second modulated optical signals via phase-sensitive amplification.

13. An apparatus, comprising:
    an optical transmitter, wherein the optical transmitter comprises:
       an optical modulator configured to modulate an optical carrier with data to generate a first modulated optical signal; and
       a nonlinear optical device configured to optically mix, via a phase-conjugation (PC) process, the first modulated optical signal, a first optical-pump signal, and a second optical-pump signal to generate a second modulated optical signal, wherein the nonlinear optical device comprises an optical filter configured to separate the first and second modulated optical signals from the first and second optical-pump signals and apply the separated first and second modulated optical signals to an output port of the optical transmitter; and an optical-transport link coupled to the output port of the optical transmitter and configured to subject the first and second modulated optical signals applied thereto to phase-sensitive amplification, wherein:

the optical-transport link is configured to generate, via said phase-sensitive amplification, a third modulated optical signal and a fourth modulated optical signal at a remote end of the optical-transport link;

each of the first and third modulated optical signals has a first carrier frequency; and each of the second and fourth modulated optical signals has a second carrier frequency different from the first carrier frequency.

14. The apparatus of claim 13, further comprising an optical receiver coupled to said remote end of the optical-transport link and configured to process at least one of the third and fourth modulated optical signals to recover the data.

15. The apparatus of claim 14, wherein the optical receiver is configured to:

discard the third modulated optical signal; and
recover the data based on the fourth modulated optical signal.

16. The apparatus of claim 14, wherein the optical receiver is configured to:

optically mix, via a second nonlinear optical process, the third modulated optical signal and the fourth modulated optical signal to generate a first mixed signal and a second mixed signal; and recover the data based on the first and second mixed signals.

17. The apparatus of claim 16, wherein the second nonlinear optical signal is a Bragg-scattering process.

18. An apparatus, comprising:

a nonlinear optical device configured to optically mix, via a first nonlinear optical process, a first modulated optical signal and a second modulated optical signal to generate a first mixed signal and a second mixed signal;

an optical detector configured to generate a first measure and a second measure, said first measure being a measure of the first mixed signal and said second measure being a measure of the second mixed signal; and a signal processor configured to:
determine a constellation symbol based on the first and second measures; and
decode the constellation symbol to determine a corresponding bit word carried by the first and second modulated optical signals; and wherein the optical detector comprises:

a first optical mixer configured to optically mix the first mixed signal with a first local-oscillator (LO) signal to generate first and second optical interference signals, wherein the first LO signal has a carrier frequency corresponding to a carrier frequency of the first modulated optical signal;

a second optical mixer configured to optically mix the second mixed signal with a second LO signal to generate third and fourth optical interference signals, wherein the second LO signal has a carrier frequency corresponding to a carrier frequency of the second modulated optical signal and different from the carrier frequency of the first LO signal; and an optical-to-electrical converter configured to convert (i) the first and second optical interference signals into the first measure and (ii) the third and fourth interference signals into the second measure.

19. The apparatus of claim 18, further comprising:

a first phase shifter configured to controllably phase-shift the first LO signal; and a phase-shift controller configured to control the first phase shifter based on a feedback signal generated by the signal processor based on the first measure.

20. The apparatus of claim 19, further comprising:

a second phase shifter configured to controllably phase-shift the second LO signal; and wherein the phase-shift controller is further configured to control the second phase shifter based on a feedback signal generated by the signal processor based on the second measure.

21. The apparatus of claim 18, further comprising an optical signal separator coupled between the nonlinear optical device and the first and second optical mixers and configured to:

separate the first mixed signal and the second mixed signal;
apply the separated first mixed signal to the first optical mixer; and
apply the separated second mixed signal to the second optical mixer.

* * * * *